United States Patent
Purkayastha et al.

(10) Patent No.: US 10,531,683 B2
(45) Date of Patent: Jan. 14, 2020

(54) PROCESS FOR MANUFACTURING A SWEETENER AND USE THEREOF

(71) Applicants: Siddhartha Purkayastha, Lombard, IL (US); Avetik Markosyan, Yerevan (AM); Magomet Malsogov, Kuala Lumpur (MY)

(72) Inventors: Siddhartha Purkayastha, Lombard, IL (US); Avetik Markosyan, Yerevan (AM); Magomet Malsogov, Kuala Lumpur (MY)

(73) Assignee: PureCircle Sdn Bhd, Kuala Lumpur (MY)

( * ) Notice: Subject to any disclaimer, the term of this patent is extended or adjusted under 35 U.S.C. 154(b) by 0 days.

(21) Appl. No.: 14/273,056

(22) Filed: May 8, 2014

(65) Prior Publication Data
US 2014/0242244 A1    Aug. 28, 2014

Related U.S. Application Data

(60) Division of application No. 13/016,545, filed on Jan. 28, 2011, now Pat. No. 8,790,730, which is a continuation-in-part of application No. 12/720,888, filed on Mar. 10, 2010, now Pat. No. 8,334,006, which is a continuation-in-part of application No. 12/684,981, filed on Jan. 11, 2010, now Pat. No. 8,298,599, and a continuation-in-part of application No. 12/684,130, filed on Jan. 8, 2010, now Pat. No. 8,323,716, and a continuation-in-part of application No. 12/684,129, filed on Jan. 8, 2010, now Pat. No. 8,318,232, and a continuation-in-part of application No. 11/246,066, filed on Oct. 11, 2005, now Pat. No. 7,807,206, and a continuation-in-part of application No. 11/246,152, filed on Oct. 11, 2005, now Pat. No. 7,862,845.

(60) Provisional application No. 61/290,778, filed on Dec. 29, 2009, provisional application No. 61/260,593, filed on Nov. 12, 2009.

(51) Int. Cl.
| | | |
|---|---|---|
| A23L 1/236 | (2006.01) |
| A23L 27/30 | (2016.01) |
| A21D 2/18 | (2006.01) |
| A21D 2/36 | (2006.01) |
| A21D 13/062 | (2017.01) |
| A23C 9/13 | (2006.01) |
| A23G 3/36 | (2006.01) |
| A23G 3/48 | (2006.01) |
| A23G 9/32 | (2006.01) |
| A23G 9/42 | (2006.01) |
| A23L 2/60 | (2006.01) |
| A23L 27/50 | (2016.01) |

(52) U.S. Cl.
CPC .......... *A23L 27/36* (2016.08); *A21D 2/181* (2013.01); *A21D 2/36* (2013.01); *A21D 13/062* (2013.01); *A23C 9/1307* (2013.01); *A23G 3/36* (2013.01); *A23G 3/48* (2013.01); *A23G 9/32* (2013.01); *A23G 9/42* (2013.01); *A23L 2/60* (2013.01); *A23L 27/33* (2016.08); *A23L 27/34* (2016.08); *A23L 27/50* (2016.08); *A23V 2002/00* (2013.01)

(58) Field of Classification Search
CPC .......... A23L 27/36; A23L 27/33; A23L 27/50; A23L 27/34; A23L 2/60; A21D 2/181; A21D 2/36; A21D 13/062; A23C 9/1307; A23G 3/36; A23G 3/48; A23G 9/32; A23G 9/42; A23V 2002/00
USPC ............... 426/443, 455, 474, 506, 548, 658
See application file for complete search history.

(56) References Cited

U.S. PATENT DOCUMENTS

| | | |
|---|---|---|
| 3,723,410 A | 3/1973 | Persinos |
| 4,082,858 A | 4/1978 | Morita et al. |
| 4,171,430 A | 10/1979 | Matsushita et al. |
| 4,219,571 A | 8/1980 | Miyake |
| 4,361,697 A | 11/1982 | Dobberstein et al. |
| 4,454,290 A | 6/1984 | Dubois |
| 4,590,160 A | 5/1986 | Nishihashi et al. |
| 4,599,403 A | 7/1986 | Kumar |
| 4,612,942 A | 9/1986 | Dobberstein et al. |
| 4,657,638 A | 4/1987 | le Grand et al. |
| 4,892,938 A | 1/1990 | Giovanetto |
| 4,917,916 A | 4/1990 | Hirao et al. |
| 5,112,610 A | 5/1992 | Kienle |
| 5,576,042 A | 11/1996 | Fuisz |
| 5,779,805 A | 7/1998 | Morano |
| 5,962,678 A | 10/1999 | Payzant et al. |
| 5,972,120 A | 10/1999 | Kutowy et al. |

(Continued)

FOREIGN PATENT DOCUMENTS

| | | |
|---|---|---|
| BR | P10701736 | 7/2008 |
| CN | 1049666 | 3/1991 |

(Continued)

OTHER PUBLICATIONS

Shi, et al., "Synthesis of bifunctional polymeric adsorbent and its application in purification of Stevia glycosides", Reactive & Functional Polymers, vol. 50 2002, 107-116.

(Continued)

*Primary Examiner* — Leslie A Wong
(74) *Attorney, Agent, or Firm* — Briggs and Morgan, P.A.; Audrey J. Babcock

(57) ABSTRACT

Highly purified Stevioside, Rebaudioside A and a purified sweet steviol glycoside mixture were prepared from sweet glycoside extracts obtained from *Stevia rebaudiana* Bertoni leaves. The resulting sweeteners are suitable as non-calorie, non-cariogenic, non-bitter, non-lingering sweeteners, which may be advantageously applied in foods, beverages, and milk products.

2 Claims, 3 Drawing Sheets

(56) References Cited

U.S. PATENT DOCUMENTS

| | | |
|---|---|---|
| 6,031,157 A | 2/2000 | Morita et al. |
| 6,080,561 A | 6/2000 | Morita et al. |
| 6,204,377 B1 | 3/2001 | Nishimoto et al. |
| 6,228,996 B1 | 5/2001 | Zhou et al. |
| 6,706,304 B1 | 3/2004 | Ishida et al. |
| 7,807,206 B2 | 10/2010 | Magomet et al. |
| 7,838,011 B2 | 11/2010 | Abelyan et al. |
| 7,862,845 B2 | 1/2011 | Magomet et al. |
| 8,257,948 B1 | 9/2012 | Markosyan |
| 2002/0132320 A1 | 9/2002 | Wang et al. |
| 2003/0161876 A1 | 8/2003 | Hansson et al. |
| 2003/0236399 A1 | 12/2003 | Zheng et al. |
| 2006/0083838 A1 | 4/2006 | Jackson et al. |
| 2006/0134292 A1 | 6/2006 | Abelyan et al. |
| 2006/0142555 A1 | 6/2006 | Jonnala et al. |
| 2007/0082102 A1 | 4/2007 | Magomet et al. |
| 2007/0082103 A1 | 4/2007 | Magomet et al. |
| 2007/0116800 A1 | 5/2007 | Prakash |
| 2007/0116819 A1 | 5/2007 | Prakash |
| 2007/0116820 A1 | 5/2007 | Prakash |
| 2007/0116821 A1 | 5/2007 | Prakash |
| 2007/0116822 A1 | 5/2007 | Prakash |
| 2007/0116823 A1 | 5/2007 | Prakash |
| 2007/0116824 A1 | 5/2007 | Prakash |
| 2007/0116825 A1 | 5/2007 | Prakash |
| 2007/0116826 A1 | 5/2007 | Prakash |
| 2007/0116827 A1 | 5/2007 | Prakash |
| 2007/0116828 A1 | 5/2007 | Prakash |
| 2007/0116829 A1 | 5/2007 | Prakash |
| 2007/0116830 A1 | 5/2007 | Prakash |
| 2007/0116831 A1 | 5/2007 | Prakash |
| 2007/0116832 A1 | 5/2007 | Prakash |
| 2007/0116833 A1 | 5/2007 | Prakash |
| 2007/0116834 A1 | 5/2007 | Prakash |
| 2007/0116835 A1 | 5/2007 | Prakash |
| 2007/0116836 A1 | 5/2007 | Prakash |
| 2007/0116837 A1 | 5/2007 | Prakash |
| 2007/0116838 A1 | 5/2007 | Prakash |
| 2007/0116839 A1 | 5/2007 | Prakash |
| 2007/0116840 A1 | 5/2007 | Prakash |
| 2007/0116841 A1 | 5/2007 | Prakash |
| 2007/0128311 A1 | 6/2007 | Prakash |
| 2007/0134390 A1 | 6/2007 | Prakash |
| 2007/0134391 A1 | 6/2007 | Prakash |
| 2007/0224321 A1 | 9/2007 | Prakash |
| 2007/0292582 A1 | 12/2007 | Prakash et al. |
| 2008/0064063 A1 | 3/2008 | Brandle et al. |
| 2008/0102497 A1 | 5/2008 | Wong et al. |
| 2008/0107775 A1 | 5/2008 | Prakash |
| 2008/0107776 A1 | 5/2008 | Prakash |
| 2008/0107787 A1 | 5/2008 | Prakash |
| 2008/0108710 A1 | 5/2008 | Prakash |
| 2008/0111269 A1 | 5/2008 | Politi et al. |
| 2008/0226797 A1 | 9/2008 | Lee et al. |
| 2008/0292764 A1 | 11/2008 | Prakash et al. |
| 2008/0292765 A1 | 11/2008 | Prakash |
| 2008/0292775 A1 | 11/2008 | Prakash |
| 2008/0300402 A1 | 12/2008 | Yang et al. |
| 2009/0017185 A1 | 1/2009 | Catani |
| 2009/0053378 A1 | 2/2009 | Prakash |
| 2009/0074935 A1 | 3/2009 | Lee |
| 2009/0079935 A1 | 3/2009 | Harris et al. |
| 2009/0142817 A1 | 6/2009 | Norman et al. |
| 2009/0226590 A1 | 9/2009 | Fouache et al. |
| 2010/0055752 A1 | 3/2010 | Kumar |
| 2010/0056472 A1 | 3/2010 | Duan et al. |
| 2010/0099857 A1 | 4/2010 | Evans et al. |
| 2010/0011215 A1 | 5/2010 | Abelyan et al. |
| 2010/0057024 A1 | 5/2010 | Cavallini et al. |
| 2010/0120710 A1 | 5/2010 | Watanabe et al. |
| 2010/0013756 A1 | 6/2010 | Prakash et al. |
| 2010/0018986 A1 | 7/2010 | Abelyan et al. |
| 2010/0189861 A1 | 7/2010 | Abelyan et al. |
| 2010/0227034 A1 | 9/2010 | Purkayastha et al. |
| 2010/0255171 A1 | 10/2010 | Purkayastha et al. |
| 2010/0278993 A1 | 11/2010 | Prakash et al. |
| 2010/0316782 A1 | 12/2010 | Shi et al. |
| 2011/0030457 A1 | 2/2011 | Valery et al. |
| 2011/0033525 A1 | 2/2011 | Lui |
| 2011/0092684 A1 | 4/2011 | Abelyan et al. |
| 2011/0104353 A1 | 5/2011 | Lee |
| 2011/0111115 A1 | 5/2011 | Shi et al. |
| 2011/0124587 A1 | 5/2011 | Jackson et al. |
| 2011/0160311 A1 | 6/2011 | Prakash et al. |
| 2011/0189360 A1 | 8/2011 | Yoo et al. |
| 2011/0195169 A1 | 8/2011 | Markosyan et al. |
| 2012/0164678 A1 | 6/2012 | Stephanopoulos et al. |
| 2012/0214752 A1 | 8/2012 | Markosyan |

FOREIGN PATENT DOCUMENTS

| | | |
|---|---|---|
| CN | 1100727 | 3/1995 |
| CN | 1112565 | 11/1995 |
| CN | 1192447 | 9/1998 |
| CN | 1238341 | 12/1999 |
| CN | 1349997 | 5/2002 |
| CN | 101200480 | 6/2008 |
| JP | 52005800 | 1/1977 |
| JP | 52083731 | 7/1977 |
| JP | 52100500 | 8/1977 |
| JP | 52136200 | 11/1977 |
| JP | 54030199 | 3/1979 |
| JP | 54132599 | 10/1979 |
| JP | 55039731 | 3/1980 |
| JP | 55081567 | 6/1980 |
| JP | 55092400 | 7/1980 |
| JP | 55120770 | 9/1980 |
| JP | 55138372 | 10/1980 |
| JP | 55159770 | 12/1980 |
| JP | 55162953 | 12/1980 |
| JP | 56099768 | 8/1981 |
| JP | 56109568 | 8/1981 |
| JP | 56121453 | 9/1981 |
| JP | 56121454 | 9/1981 |
| JP | 56121455 | 9/1981 |
| JP | 56160962 | 12/1981 |
| JP | 57002656 | 1/1982 |
| JP | 57005663 | 1/1982 |
| JP | 57046998 | 3/1982 |
| JP | 57075992 | 5/1982 |
| JP | 57086264 | 5/1982 |
| JP | 58020170 | 2/1983 |
| JP | 58028246 | 2/1983 |
| JP | 58028247 | 2/1983 |
| JP | 58212759 | 12/1983 |
| JP | 58212760 | 12/1983 |
| JP | 59045848 | 3/1984 |
| JP | 62166861 | 7/1987 |
| JP | 63173531 | 7/1988 |
| JP | 1131191 | 5/1989 |
| JP | 3262458 | 11/1991 |
| JP | 6007108 | 1/1994 |
| JP | 6192283 | 7/1994 |
| JP | 7143860 | 6/1995 |
| JP | 7177862 | 7/1995 |
| JP | 8000214 | 1/1996 |
| JP | 9107913 | 4/1997 |
| JP | 2000236842 | 9/2000 |
| JP | 2002262822 | 9/2002 |
| JP | 2010516764 | 5/2010 |
| KR | 20070067199 | 6/2007 |
| KR | 20080071605 | 8/2008 |
| KR | 20090021386 | 3/2009 |
| RU | 2111969 | 5/1998 |
| RU | 2123267 | 12/1998 |
| RU | 2156083 | 9/2000 |
| RU | 2167544 | 5/2001 |
| RU | 2198548 | 2/2003 |
| WO | 2005089483 | 9/2005 |
| WO | 2006072878 | 7/2006 |
| WO | 2006072879 | 7/2006 |
| WO | 2008091547 | 7/2008 |
| WO | 2009108680 | 9/2009 |
| WO | 2010118218 | 10/2010 |

(56) References Cited

FOREIGN PATENT DOCUMENTS

| | | |
|---|---|---|
| WO | 2011059954 | 5/2011 |
| WO | 2011153378 | 12/2011 |
| WO | 2012082493 | 6/2012 |
| WO | 2012082677 | 6/2012 |
| WO | 2013022989 | 2/2013 |

OTHER PUBLICATIONS

Shibata et al., "Glucosylation of Steviol and Steviol-Glucosides in Extracts from Stevia rebaudiana Bertoni," Plant Physiol vol. 95, (1991) 152-156.
Starratt, et al., "Rebaudioside F, a diterpene glycoside from Stevia Rebaudiana", Phytochemistry, vol. 59 2002, 367-370.
Sweet Green Fields, LLC, "Notice to the U.S. Food and Drug Administration (FDA) that the use of Rebiana (Rebaudiosid A) derived from Stevia rebaudiana, as a Food Ingredient is Generally Recognized as Safe (GRAS)," Jan. 15, 2009, http:/www.accessdata.fda.gov/scripts/fcn/gras_notices/gm000282.pdf (obtained from the WEB on May 8, 2012) entire document esp. p. 22, Table 1.
Tanaka, O. , "Improvement of taste of natural sweeteners", Pure & Appl. Chem., vol. 69, No. 4 1997, 675-683.
Teo, et al., "Validation of green-solvent extraction combined with chromatographic chemical fingerprint to evaluate quality of Stevia rebaudiana Bertoni", J. Sep. Sci, vol. 32 2009, 613-622.
United Nations' Food and Agriculture Organization/Joint Expert Committee on Food Additives (2010) Steviol Glycosides, Compendium of Food Additive Specifications, FAO JECFA Monographs 10, 17-21.
van der Maarel et al., "Properties and applications of starch-converting enzymes of the a-amylase family," Journal of Biotechnology, vol. 94 (2002) 137-155.
Vasquez, Stimulation of the Gerbil's Gustatory Receptors by Some Potently Sweet Terpenoids, J. Agric. Food Chem., vol. 41, 1305-1310, 1993.
Yamamoto, K. et al., "Effective Production of Glycosyl-steviosides by a-1,6 Transglucosylation of Dextrin Dextranase", Biosci. Biotech. Biochem. vol. 58, No. 9 1994, 1657-1661.
Yoda, et al., "Supercritical fluid extraction from Stevia rebaudiana Bertoni using CO2 and CO2+ water: extraction kinetics and identification of extracted components", Journal of Food Engineering, vol. 57 2003, 125-134.
Zell, et al., "Investigation of Polymorphism in Aspartame and Neotame Using Solid-State NMR Spectroscopy", Tetrahedron, vol. 56, 2000, 6603-6616.
Zhang, et al., "Membrane-based separation scheme for processing sweetener from Stevia leaves", Food Research International, vol. 33 2000, 617-620.
A-Glucosyltransferase Treated Stevia, Japan's Specifications and Standards for Food Additives, VIII edition, 2009, p. 257.
Ahmed, et al., "Use of p-Bromophenacyl Bromide to Enhance Ultraviolet Detection of Water-Soluble Organic Acids (Steviolbioside and Rebaudioside B) in High-Performance Liquid Chromatographic Analysis", Journal of Chromatography, vol. 192, 1980, 387-393.
Chang, S. S. et al., "Stability Studies of Stevioside and Rebaudioside A in Carbonated Beverages", Journal of Agricultural and Food Chemistry, vol. 31, 1983, 409-412.
Chen, et al., "Enrichment and separation of rebaudioside A from stevia glycosides by a novel adsorbent with pyridyl group", Science in China, vol. 42, No. 3 1999, 277-282.
Chen, et al., "Selectivity of polymer adsorbent in adsorptive separations of stevia diterpene glycisides", Science in China, vol. 41, No. 4 1998, 436-441.
Chen, et al., "Studies on the adsorptive selectivity of the polar resin with carbonyl group on rebaudioside A", Acta Polymeric Scnica, No. 4 1999, 398-403.
Crammer, et al., "Sweet glycosides from the Stevia plant", Chemistry in Britain, Oct. 1986, 915-916, 918.
Darise et al., "Enzymic Transglucosylation of Rubusoside and the Structure-Sweetness Relationship of Steviol Bisglycosides," Agric. Biol. Chem. vol. 48(10), 1984, 2483-2488.
Dubois et al., "Diterpenoid Sweeteners. Synthesis and Sensory Evaluation of Stevioside Analogues with Improved Organoleptic Properties," J. Med. Chem. vol. 28, (1985) 93-98.
Fuh, , "Purification of steviosides by membrane and ion exchange process", Journal of Food Science, vol. 55, No. 5 1990, 1454-1457.
Fukunaga et al., "Enzymic Transglucosylation Products of Stevioside: Separation and Sweetness-evaluation," Agric. Biol. Chem. vol. 53(6) (1989) 1603-1607.
Fullas et al., "Separation of natural product sweetening agents using overpressured layer chromatography," Journal of Chromatography vol. 464 (1989) 213-219.
Hale, et al., "Amylase of Bacillus Macerans", Cereal Chemistry, vol. 28, No. 1, Jan. 1951, 49-58.
International Search Report and Written Opinion of PCT/US2010/055960.
International Search Report and Written Opinion of PCT/US2011/028028.
International Search Report and Written Opinion of PCT/US2011/033734.
International Search Report and Written Opinion of PCT/US2011/033737.
International Search Report and Written Opinion of PCT/US2011/033912.
International Search Report and Written Opinion of PCT/US2011/035173.
International Search Report and Written Opinion of PCT/US2011/036063, dated Aug. 5, 2011.
International Search Report and Written Opinion of PCT/US2011/047498, dated Dec. 22, 2011.
International Search Report and Written Opinion of PCT/US2011/047499, dated Dec. 22, 2011.
International Search Report and Written Opinion of PCT/US2011/064343.
International Search Report and Written Opinion of PCT/US2012/024585.
International Search Report and Written Opinion of PCT/US2012/024722.
International Search Report and Written Opinion of PCT/US2012/030210.
International Search Report and Written Opinion of PCT/US2012/043294.
International Search Report and Written Opinion of PCT/US2012/051163.
International Search Report and Written Opinion of PCT/US2012/052659.
International Search Report and Written Opinion of PCT/US2012/052665.
International Search Report and Written Opinion of PCT/US2013/030439.
Jaitak, et al., "An Efficient Microwave-assisted Extraction Process of Stevioside and Rebaudioside-A from Stevia Rebaudiana (Bertoni)", Phytochem. Anal. vol. 20 2009, 240-245.
Kennelly, "Sweet and non-sweet constituents of Stevia rebaudiana", Stevia: The genus Stevia, Taylor & Francis, 2002, 68-85.
Kinghorn, "Overview", Stevia: The genus Stevia, Taylor & Francis, 2002, 1-17.
Kitahata, S. et al., "Production of Rubusoside Derivatives by Transgalactosylation of Various b-Galactosidases", Agric. Biol. Chem., vol. 53, No. 11 1989, 2923-2928.
Kobayashi, et al., "Dulcoside A and B, New diterpene glycosides from Stevia Rebaudiana", Phytochemistry, vol. 16 1977, 1405-1408.
Kochikyan, et al., "Combined Enzymatic Modification of Stevioside and Rebaudioside A", Applied Biochemistry and Microbiology, vol. 42, No. 1, 2006, 31-37.
Kohda, et al., "New sweet diterpene glucosides from Stevia Rebaudiana", Phytochemistry, vol. 15 1976, 981-983.
Kovylyaeva, et al., "Glycosides from Stevia rebaudiana", Chemistry of Natural Compounds, vol. 43, No. 1 2007, 81-85.

(56) References Cited

OTHER PUBLICATIONS

Liu, et al., "Study of stevioside preparation by membrane separation process", Desalination, vol. 83 1991, 375-382.

Lobov, S. V. et al., "Enzymic Production of Sweet Stevioside Derivatives: Transglucosylation of Glucosidases", Agric. Biol. Chem., vol. 55, No. 12 1991, 2959-2965.

Montovaneli, et al., "The effect of temperature and flow rate on the clarification of the aqueous Stevia-extract in fixed-bed column with zeolites", Brazilian Journal of Chemical Engineering, vol. 21, No. 3 2004, 449-458.

Moraes, et al., "Clarification of Stevia rebaudiana (Bert.) Bertoni extract adsorption in modified zeolites", Acta Scientiarum, vol. 23, No. 6 2001, 1375-1380.

Ohta et al., "Characterization of Novel Steviol Glycosides from Leaves of Stevia rebaudiana Morita," J. Appl. Glycosi., vol. 57, 199-209, 2010.

Ohtani et al. "Chapter 7. Methods to improve the taste of the sweet principles of Stevia rebaudiana." The Genus Stevia, edited by A. Douglas Kinghorn, CRC Press 2001, Taylor and Francis, London and New York, pp. 138-159.

Phillips, K. C., "Stevia: steps in developing a new sweetener", In T.H. Grenby, Editor, Developments in Sweeteners-3, Elsevier 1987, 1-43.

Pol, et al., "Comparison of two different solvents employed for pressurised fluid extraction of stevioside from Stevia rebaudiana: methanol versus water", Anal Bioanal Chem vol. 388 2007, 1847-1857.

Prakash et al., "Development of rebiana, a natural, non-caloric sweetener," Jul. 1, 2008, Food and Chemical Toxology, vol. 46, Is. 7, Sup. 1, p. S75-S82.

Richman et al., "Fuctional genomics uncovers three glucosyltransferases involved in the synthesis of the major sweet glucosides of Stevia rebaudiana," The Plant Journal, vol. 41 (2005) 56-67.

Sakamoto et al., "Application of 13C NMR Spectroscopy to Chemistry of Natural Glycosides: Rebaudioside-C, a New Sweet Diterpene Glycoside of Stevia Rebaudiana", Chem. Pharm. Bull., vol. 25, 1977, 844-846.

Hartel, Richard W.; Ergun, Roja; and Vogel, Sarah. "Phase/State Transitions of Confectionary Sweeteners: Thermodynamic and Kinetic Aspects." Comprehensive Reviews in Food Science and Food Safety, vol. 10, 2011, pp. 17-32.

PROCESS FOR MANUFACTURING A SWEETENER AND USE THEREOF

RELATED APPLICATIONS

This application is a continuation-in-part application of and claims the benefit of priority to U.S. patent application Ser. No. 12/720,888, filed Mar. 10, 2010, now U.S. Pat. No. 8,334,006, which is a continuation-in-part application of the following applications: U.S. patent application Ser. No. 11/246,066, filed Oct. 11, 2005, now U.S. Pat. No. 7,807,206; U.S. patent application Ser. No. 11/246,152, filed Oct. 11, 2005, now U.S. Pat. No. 7,862,845; U.S. provisional application Ser. No. 61/260,593, filed Nov. 12, 2009; U.S. provisional application Ser. No. 61/290,778, filed Dec. 29, 2009; U.S. patent application Ser. No. 12/684,129, filed Jan. 8, 2010; now U.S. Pat. No. 8,318,232, U.S. patent application Ser. No. 12/684,130, filed Jan. 8, 2010; now U.S. Pat. No. 8,323,716, and U.S. patent application Ser. No. 12/684,981, filed Jan. 11, 2010, now U.S. Pat. No. 8,298,599.

This application is a divisional of U.S. patent application Ser. No. 13/016,545, filed Jan. 28, 2011, now U.S. Pat. No. 8,790,730.

BACKGROUND OF THE INVENTION

1. Field of The Invention

The present invention relates to a process for producing a highly purified sweet steviol glycoside mixture, Stevioside and Rebaudioside A from the extract of the *Stevia rebaudiana* Bertoni plant and use thereof in various food products and beverages.

2. Description of The Related Art

In view of food sanitation, the use of artificial sweeteners such as dulcin, sodium cyclamate and saccharin has been restricted. However natural sweeteners have been receiving increasing demand. *Stevia rebaudiana* Bertoni is a plant that produces an alternative sweetener that has an added advantage of being a natural plant product. In addition, the sweet steviol glycosides have functional and sensory properties superior to those of many high potency sweeteners.

The extract of *Stevia rebaudiana* plant contains a mixture of different sweet diterpene glycosides, which have a single base—steviol and differ by the presence of carbohydrate residues at positions C13 and C19. These glycosides accumulate in *Stevia* leaves and compose approximately 10%-20% of the total dry weight. Typically, on a dry weight basis, the four major glycosides found in the leaves of *Stevia* are Dulcoside A (0.3%), Rebaudioside C (0.6%), Rebaudioside A (3.8%) and Stevioside (9.1%). Other glycosides identified in *Stevia* extract include Rebaudioside B, C, D, E, and F, Steviolbioside and Rubusoside.

The physical and sensory properties are well studied only for Stevioside and Rebaudioside A. They were tested for stability in carbonated beverages and found to be both heat and pH stable (Chang and Cook, 1983). The sweetness potency of Stevioside is around 210 times higher than sucrose, Rebaudioside A in between 200 and 400 times, and Rebaudioside C and Dulcoside A around 30 times (Phillips, 1989 and Tanaka, 1997).

However, apart from its high level of sweetness, they have also intrinsic properties of post-bitter taste and unpleasant and undesirable aftertaste. Some undesirable taste characteristics of glycosides can be as a result of contamination of other substances, presented in extract.

One of the main ways to improve the taste quality is the enzymatic glycosylation of mixture of semi-purified steviol glycosides. Another way to produce highly purified individual glycosides with standard characteristics and minimal content of accompanying compounds.

The invention related to the purification of two main glycosides—Stevioside and Rebaudioside A and use thereof.

A process for the recovery of diterpene glycosides, including Stevioside from the *Stevia rebaudiana* plant is described (U.S. Pat. No. 4,361,697). A variety of solvents, having different polarities, were used in a sequential treatment that concluded with a high performance liquid chromatographic (HPLC) separation procedure.

A method for the recovery of Rebaudioside A from the leaves of *Stevia rebaudiana* plants has been developed (U.S. Pat. No. 4,082,858). Again, final purification is achieved by liquid chromatography subsequent to an initial extraction with water and an alkanol having from 1 to 3 carbon carbons, preferably methanol. It is also known that water may be used as the initial solvent; their preferred solvent at this stage is a liquid haloalkane having from 1 to 4 carbon atoms. The preferred second solvent is an alkanol having from 1 to 3 carbon atoms, while the preferred third solvent is an alkanol having from 1 to 4 carbon atoms and optionally minor amounts of water.

Individual sweet glycosides can be obtained from the *Stevia rebaudiana* plant. A mixture of sweet glycosides extracted from the *Stevia rebaudiana* plant is processed to remove impurities by using two types of ion-exchangers. After removing the mixed sweet glycosides from the second column with methanol, the solution is dried. Upon refluxing the dried solids in a methanol solution and then cooling the solution, Stevioside precipitates out. The filtrate is further concentrated and cooled to precipitate out Rebaudioside A. This Rebaudioside A can be further purified as can the previously obtained Stevioside (U.S. Pat. No. 5,962,678). However, a large amount of toxic organic solvent, such as methanol is used.

However, all the above-mentioned methods allow the production of Stevioside and Rebaudioside A not in highly purified grade, which further possess a residual bitterness and aftertaste.

On the other hand, the unfavorable taste of the glycosides can be as a result of contamination of impurities, presented in extract. Highly purified Stevioside and Rebaudioside A possessing an improved taste profile and there is a need to provide an easy and commercially valuable process for the manufacturing the highly purified Stevioside and Rebaudioside A, and use thereof in various beverages and food products.

SUMMARY OF INVENTION

An object of the present invention is to provide a commercially valuable process for producing a highly purified sweetener from the extract of *Stevia rebaudiana* Bertoni plant and use thereof in various food products and beverages, which overcomes the disadvantages of the related art.

The invention, in part, pertains to the dried and powdered leaves being subjected to water extraction and the resulted extracts is purified using treatment with a base such as calcium hydroxide and then iron chloride. The filtrate was deionized on, e.g., Amberlite FPC23H, Amberlite FPA51, and Amberlite FPA98CI. The filtrate is concentrated under vacuum and spray dried. The isolation and purification of Stevioside and Rebaudioside A were developed using alcoholic precipitation and ultrafiltration. The highly purified Stevioside and Rebaudioside A were obtained. Any type of existing *Stevia* extract with various ratios of sweet steviol glycosides are feasible.

The highly purified glycosides were applied in various foods and beverages as sweetener.

The invention, in part, pertains to a purified sweet glycosides extract produced from the *Stevia rebaudiana* plant, wherein the main sweet glycosides are Rebaudioside A and Stevioside, obtained by a process including drying *Stevia rebaudiana* leaves, treating the leaves to extract an aqueous liquid solution containing mixed sweet steviol glycosides, extracting the *Stevia rebaudiana* leaves, obtaining an extract, filtering the extract, obtaining a filtrate, treating the filtrate with a base such as calcium hydroxide, treating the extract with trivalent iron chloride, desalting, decolorizing, and evaporating the filtrate to dryness.

In the invention, purified Rebaudioside A and Stevioside can be obtained by dissolving sweet steviol glycosides in methanol at ambient temperatures to precipitate Stevioside, filtering the solution to recover a precipitate of Stevioside, purifying, recovering a high purity Stevioside, concentrating the remaining solution and evaporating to dryness, suspending the powder in ethanol, heating and then cooling the solution to precipitate Rebaudioside A. Suspending the crystalline Rebaudioside A obtained in ethanol-water solution at cool conditions (10-12° C.) prepares a high purity of Rebaudioside A. Stevioside or Rebaudioside A has a purity of at least 98%. Applications are found in various foods such as chocolate, ice cream, beverage, dairy products, as a sweetener in a tablet form.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention. The drawings illustrate embodiments of the invention and together with the description serve to explain the principles of the embodiments of the invention.

DETAILED DESCRIPTION

Figure 1:
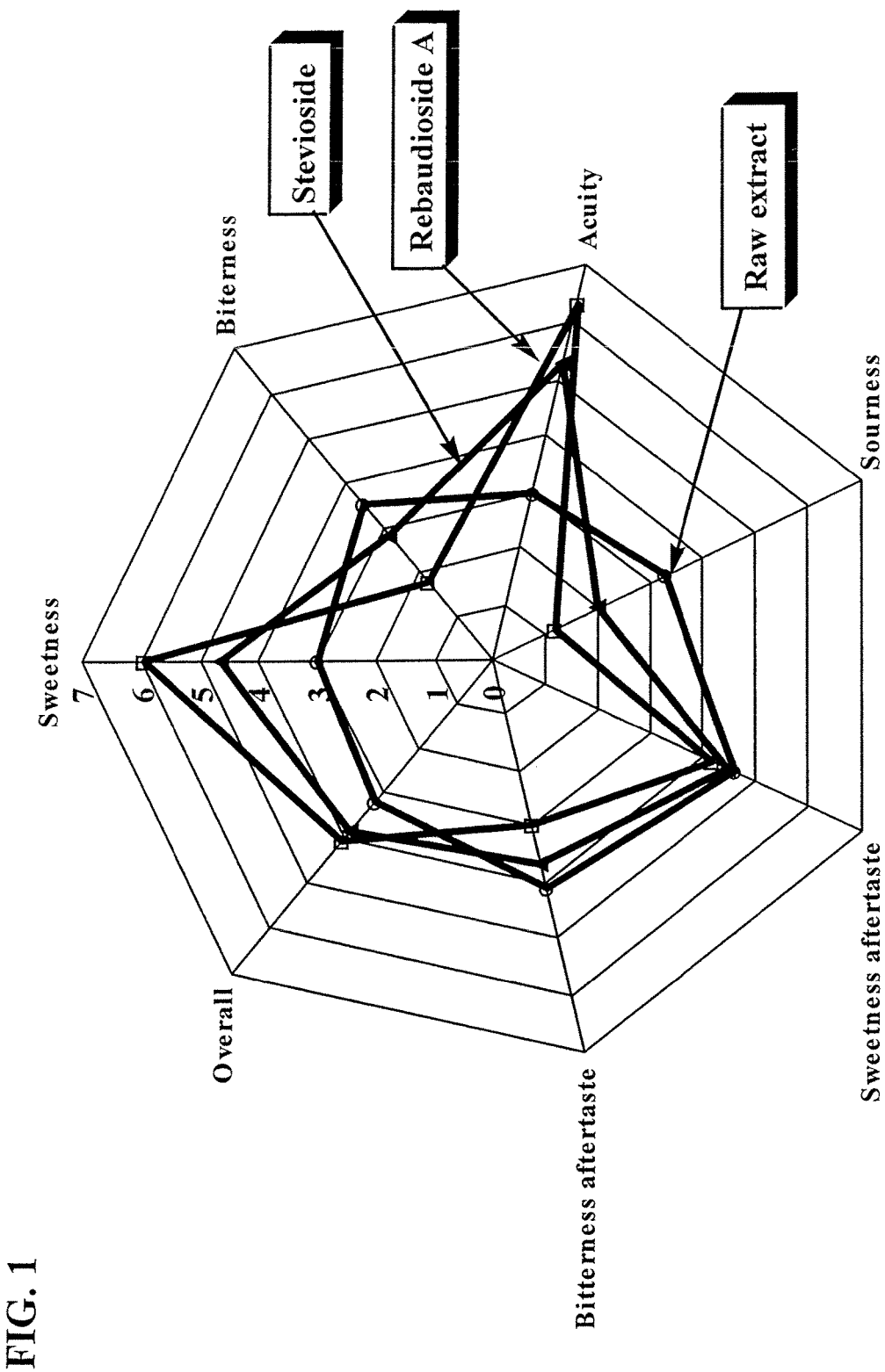
FIG. 1 shows a sensory evaluation of raw *Stevia* extract, Stevioside, and Rebaudioside A.

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The dried leaves of *Stevia rebaudiana* Bertoni were extracted by 10 volumes of water. The proportion of extraction water preferably was about 5 liters to about 15 liters (pH 6.0 to 7.0) to one kilogram of leaves. Greater volumes of solvent can be used, however, it was not preferable from the practical standpoint. The duration of extraction may be from 0.5 hours to 24 hours, with a period of from about 1 hours to about 6 hours preferred.

The extraction temperature can be in the limits of 25-90° C., however the temperatures between 45-75° C. are more preferable.

The plant material was separated from the solution by filtration, and the pH of the filtrate was adjusted to about 10 with calcium hydroxide and heated between 40-60° C., preferably from 50° C. to 55° C., for about 0.5-1.0 hours, cooled to ambient temperature with slow agitation, and neutralized by $FeCl_3$. After mixing for 10-15 minutes, the precipitate was removed by filtration; the filtrate was passed through the Celite, deionized, and decolorized by Amberlite FPC23H, Amberlite FPA51, and Amberlite FPA98CI by conventional manner. The solution was concentrated and spray dried.

The resulting sweet steviol glycoside mixture was a yellow powder and had a content of 3.4% Dulcoside, 64.6% Stevioside, 6.7% Rebaudioside C and 25.3% Rebaudioside A.

An HPLC analysis of the obtained product was carried out using an Agilent Technologies 1100 Series (USA) equipped with Zorbax-$NH_2$ column using acetonitrile-water gradient from 80:20, v/v (2 minutes) to 50:50, v/v during 70 minutes and UV detector at 210 nm.

The obtained powder was dissolved in methanol and maintained at a temperatures 20-50° C., preferably at 20-25° C., for 0.5-6.0 hours, preferably 0.5-1.0 hours with agitation. The proportion of extract and methanol was between 1:2-1:7, w/v, preferably 1:5. During this time the precipitate was formed, which was filtered and dried. According to the HPLC analysis, the powder contents were around 90-91% of Stevioside. A second treatment by methanol was not efficient to prepare high purity Stevioside.

For the further purification, the powder was mixed with two volumes of 90% of ethanol and at 10-12° C. and maintained for about 30 minutes with slow agitation. The precipitate was separated by filtration and dried under vacuum. The Stevioside with about 98.5-99.4% purity was obtained.

The filtrates were combined and used for recovery of Rebaudioside A. For this purpose the remaining solution was evaporated to remove the methanol, the syrup obtained diluted with water and passed through polysulfone based ultrafiltration membranes (with a filtering discrimination of 2.5 kDa) (Liumar Technologies, Ottawa, Canada) with diafiltration. The filtrate was concentrated and spray dried. The obtained powder was mixed with 96.2% ethanol and maintained at 45-50° C. for about 30 minutes with agitation. The proportion of syrup and ethanol was between 1:2-1:7, w/v, preferably 1:5. During this time the precipitate was formed, which was filtered and dried. Rebaudioside A with 88-90% purity was obtained. For the further purification the powder was mixed with two volumes of 92% ethanol and maintained at 10-12° C. for about 60 minutes with slow agitation. The crystals were filtered and dried. Rebaudioside A with 98.9% purity was obtained.

Based on the results of preliminary test on the sweetening power of the sweeteners, aqueous solutions of commercial *Stevia* extract (0.05%) commercialized by Ganzhou Julong High-Tech Food Industry Co., Ltd (China), Stevioside (0.07%), and Rebaudioside A (0.028%) were prepared.

The organoleptic test was carried out with 30 previously trained panel members. It was observed that Rebaudioside A has the highest sweetness level (5.96), followed by Stevioside with a mean score of 4.62, and commercial *Stevia* extract had the lowest mean score of 2.96. Rebaudioside A had the lowest score for bitterness (1.76), and commercial Stevia extract was the most bitter compared to the other samples. For overall acceptability, Rebaudioside A had the highest score of 4.05 followed by Stevioside (3.81) and raw extract (3.16) (FIG. 1).

Figure 2:
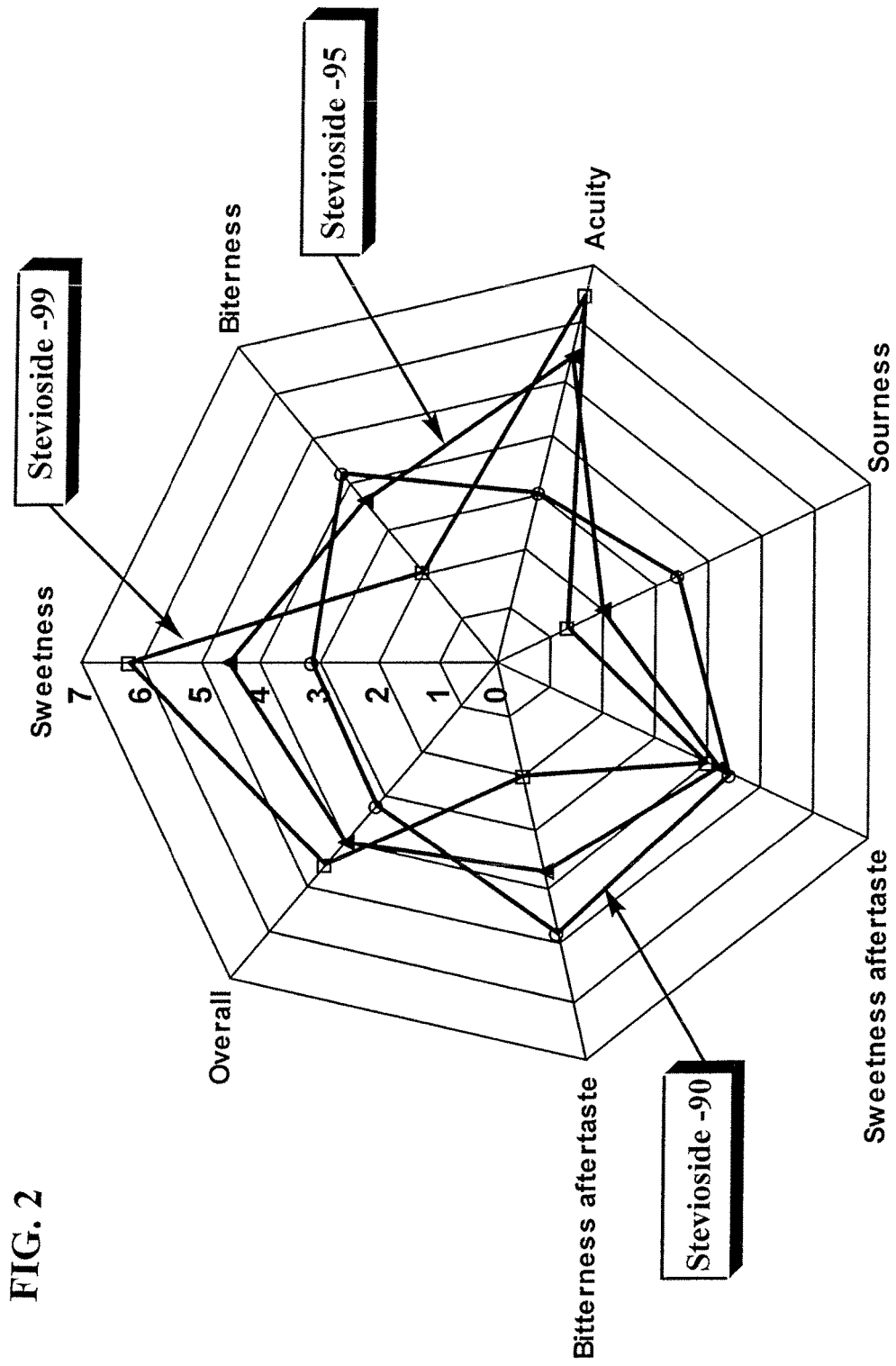
FIG. 2 shows a sensory evaluation of Stevioside with a different grade of purity.
Figure 3:
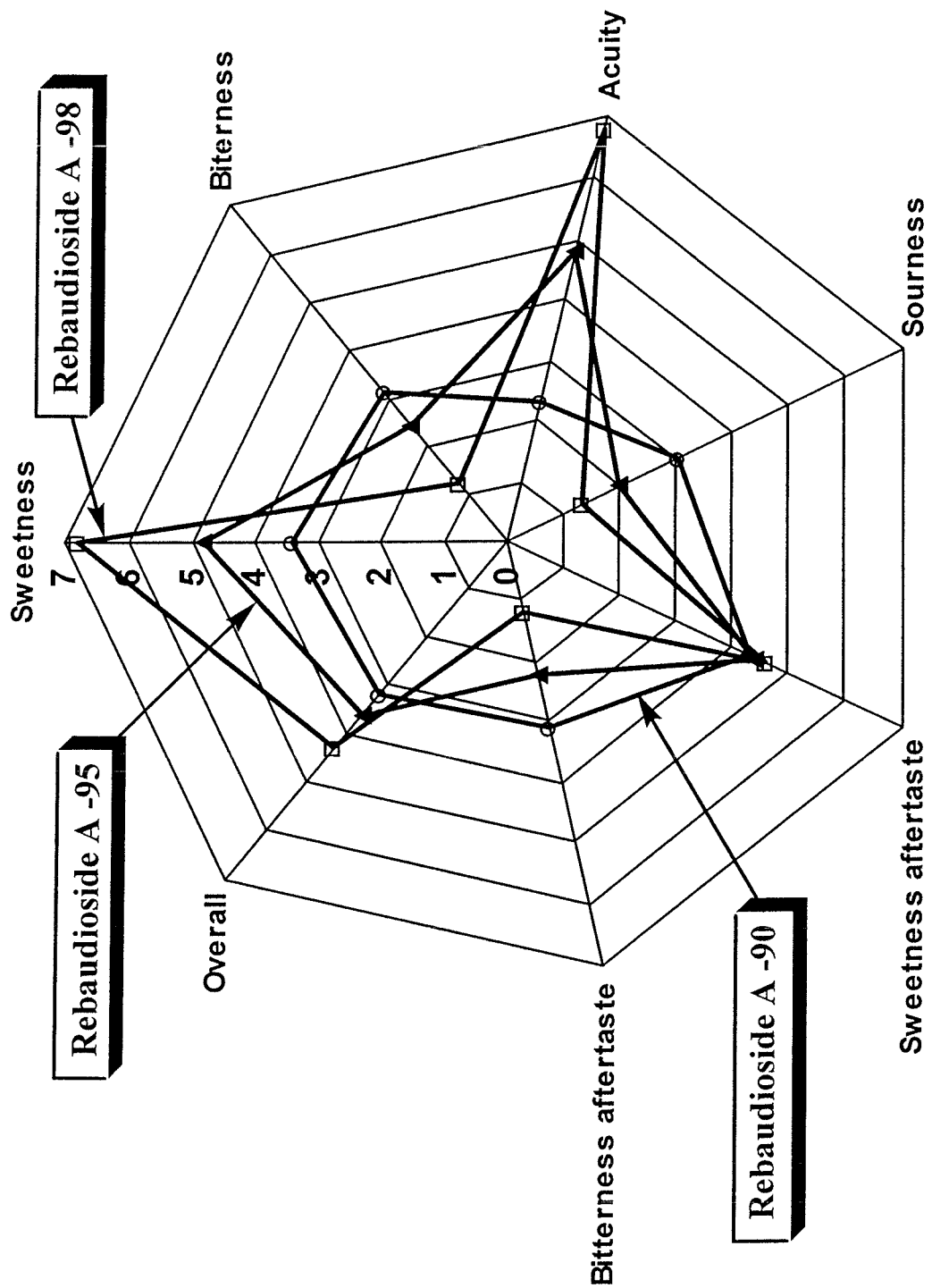
FIG. 3 shows a sensory evaluation of Rebaudioside A with a different grade of purity.

The taste profile of Stevioside with 99.3% of purity was more preferable as compared with 90.2 and 95.4% (FIG. 2). The similar feature was obtained for Rebaudioside A with various grades of purity (FIG. 3).

The highly purified sweeteners can be favorably used for seasoning various food products (for instance, soy sauce, soy sauce powder, soy paste, soy paste powder, dressings, mayonnaise, vinegar, powdered vinegar, bakery products and confectioneries, frozen-desserts, meat products, fish-meat products, potato salad, bottled and canned foods, fruit and vegetables) in intact or mixed forms with other sweeteners, such as corn syrup, glucose, maltose, sucrose, lactose, aspartame, saccharin, sugar alcohols, organic and amino acids, flavors and/or coloring agents.

The products are favorably usable as a low-cariogenic and low-calorie sweetener because it is less fermentable by oral dental-caries causative microorganisms. Exemplary applications include low-cariogenic food products such as confectioneries including chewing gum, chocolate, biscuits, cookies, toffee and candy. Additionally applications include soft drinks such as coffee, cocoa, juice, carbonated drinks, sour milk beverage, yogurt drinks and alcoholic drinks, such as brandy, whisky, vodka and wine. In addition to the above-described uses, the sweeteners are usable for sweetening drugs and cosmetics.

The following examples illustrate preferred embodiments of the invention.

Example 1

Extraction of Sweet Steviol Glycosides

The leaves of Stevia rebaudiana are dried at 55° C. for three hours in a vacuum oven and powdered (30 mesh). One kg of the obtained material was mixed with 10 liters of water (pH 6.5) and heated to 55° C. with slow agitation for 10 hours. The plant material was separated from the solution by filtration and the pH of the filtrate was adjusted to 10 with about 24 grams of calcium hydroxide and heated to 50° C. for 0.5 hours. The obtained mixture was cooled to ambient temperature and the pH was adjusted to about 7.0 by about 53 grams of $FeCl_3$. After mixing for 15 minutes the precipitate was removed by filtration.

The slightly yellow filtrate was passed through the Celite, deionized, and decolorized by conventional manner on Amberlite FPC23H, Amberlite FPA51, and Amberlite FPA98CI commercialized by ROHM & HAAS Co., Germany. The solution was concentrated and spray dried. The yield was 122 grams of powder with a content of sweet glycosides of about 91%. The sweet steviol glycoside mixture contains 3.4% Dulcoside, 64.6% Stevioside, 6.7% Rebaudioside C and 25.3% Rebaudioside A. In another embodiment, a sweet steviol glycoside mixture with a purity of at least about 95% was obtained. In a further embodiment, a sweet steviol glycoside mixture with a purity of at least about 98% was obtained.

Example 2

Preparation of Stevioside 100 grams (on the base of dry material) of the sweet steviol glycoside powder obtained by the process of EXAMPLE 1 was mixed with 0.5 liters of methanol and maintained at 25° C. for 45 minutes with slow agitation. The precipitate Stevioside was filtered and dried. 61.2 grams of Stevioside with 90.6% purity was obtained.

For the further purification the powder was mixed with two parts of 90% of ethanol, and maintained at 10-12° C. for about 30 minutes with slow agitation. The precipitate was separated by filtration and dried under vacuum. The product weighed 58.8 grams and contained 99.3% Stevioside. In another embodiment, Stevioside with a purity of at least about 98% was obtained.

Example 3

Preparation of Rebaudioside A

The remaining solutions after separation of Stevioside (EXAMPLE 2) were combined, and methanol was removed by evaporation. The syrup was diluted with water and passed through polysulfone based ultrafiltration membranes (with a filtering discrimination of 2.5 kDa) (Liumar Technologies, Ottawa, Canada) with diafiltration. The filtrate was concentrated and spray dried. 40.8 grams of powder with content of Rebaudioside A of around 60% were obtained. The powder was mixed with five volumes (w/v) of 96.2% ethanol and maintained at 50° C. for 30 minutes with slow agitation. The precipitate was filtered and dried. Rebaudioside A with 89.8% purity was obtained. The powder was mixed with two volumes of 92% of ethanol and maintained at 12° C. for 60 minutes with slow agitation. The crystals were filtered and dried. 23.6 grams of Rebaudioside A of 98.9% purity was obtained. In another embodiment, Rebaudioside A with a purity of at least about 98% was obtained.

Example 4

Low-Calorie Orange Juice Drink

Orange concentrate (35%), citric acid (0.38%), ascorbic acid (0.05%), sodium benzoate (0.02%), orange red color (0.01%), orange flavor (0.20%), and sweetener (0.06%) containing 90.2, 95.4 or 99.3% of Stevioside, or 80, 90, or 98.9% of Rebaudioside A were blended and dissolved completely in the water (up to 100%) and pasteurized. The sensory evaluation of the samples is summarized in the TABLE 1. The data shows that best results were obtained for highly purified Rebaudioside A and Stevioside.

TABLE 1

| Sample | Comments | | |
|---|---|---|---|
| | Flavor | Aftertaste | Mouth feel |
| Stevioside - 90.2% | Sweet and balanced flavor | Slight bitterness in aftertaste | Acceptable |
| Stevioside - 95.4% | Sweet and balanced flavor | Slight bitterness in aftertaste | Acceptable |
| Stevioside - 99.3% | Sweet, pleasant, balanced flavor | Clean, no bitterness | Quite full |
| Rebaudioside A - 80.0% | Sweet, rounded and balanced Flavor | Almost no any bitterness | Acceptable |
| Rebaudioside A - 90.0% | Sweet, rounded and balanced Flavor | Almost no any bitterness | Full |
| Rebaudioside A - 98.9% | High quality of sweetness, pleasant, taste similar to sucrose, balanced flavor | Clean, no unpleasant aftertaste | Quite full |

By the same way can be prepared juices from other fruits, such as apple, lemon, apricot, cherry, pineapple, etc.

Example 5

Low-calorie Carbonated Lemon-Flavored Beverage
The formula for the beverage was as below:

| Ingredients | Quantity, kg |
| --- | --- |
| Sugar | 30.0 |
| Sweetener | 0.4 |
| Citric acid | 2.5 |
| Green tea extract | 25.0 |
| Salt | 0.3 |
| Lemon tincture | 10.0 L |
| Juniper tincture | 8.0 L |
| Sodium benzoate | 0.17 |
| Carbonated water | up to 1000 L |

Sensory and physicochemical characteristics of the drink are presented in the TABLE 2.

The drinks with highly purified Rebaudioside A and Stevioside were superior with an excellent flavor and taste.

TABLE 2

| | Characteristics | | | |
| --- | --- | --- | --- | --- |
| Item | Stevioside - 90.2% | Stevioside - 99.3% | Rebaudioside A - 90.0% | Rebaudioside A - 98.9% |
| Appearance | Transparent liquid, free of sediment and strange impurities. A light opalescence, caused by features of used raw materials is possible. | Transparent liquid, free of sediment and strange impurities. A light opalescence, caused by features of used raw materials is possible. | Transparent liquid, free of sediment and strange impurities. A light opalescence, caused by features of used raw materials is possible. | Transparent liquid, free of sediment and strange impurities. A light opalescence, caused by features of used raw materials is possible. |
| Color | From light yellow up to Yellow | From light yellow up to yellow | From light yellow up to yellow | From light yellow up to yellow |
| Taste | Sour-sweet, some bitterness in aftertaste | Sour-sweet, expression of sweetness is rapid. The taste is satisfactory. | Sour-sweet, almost no any bitterness, expression of sweetness is rapid. | Sour-sweet, expression of sweetness is rapid. |

Example 6

Low-Calorie Carbonated Drink
The formula for the beverage was as below:

| Ingredients | Quantity, % |
| --- | --- |
| Cola flavor | 0.340 |
| Phosphoric acid (85%) | 0.100 |
| Sodium citrate | 0.310 |
| Sodium benzoate | 0.018 |
| Citric acid | 0.018 |
| Sweetener | 0.030 |
| Carbonated water | to 100 |

The beverages prepared with different sweeteners were given to 10 judges for comparison. TABLE 3 shows the results.

TABLE 3

| | Number of panelists | | | |
| --- | --- | --- | --- | --- |
| Comparison Point | Stevioside- 90.2% | Stevioside- 99.3% | Rebaudioside A 90.0% | Rebaudioside A 98.9% |
| Bitter taste | 6 | 2 | 3 | 0 |
| Astringent taste | 6 | 2 | 3 | 0 |
| Aftertaste | 6 | 2 | 3 | 0 |
| Quality of sweet taste | Sweet, bitterness in aftertaste (6 of the 10 judges) | Clean (7 of the 10 judges) | Sweet, some bitterness in aftertaste (5 of the 10 judges) | Clean (10 of the 10 judges) |
| Overall evaluation | Satisfactory (5 of the 10 judges) | Satisfactory (8 of the 10 judges) | Satisfactory (8 of the 10 judges) | Satisfactory (10 of the 10 judges) |

The above results show that the beverages prepared using highly purified Stevioside and Rebaudioside A possessing good organoleptic characteristics.

Example 7

Chocolate

A composition containing 30 kg of cacao liquor, 11.5 kg of cacao butter, 14 kg of milk powder, 44 kg of sorbitol, 0.1 kg of salt, and 0.1 kg of sweetener prepared according to the EXAMPLES 2 or 3, was kneaded sufficiently, and the mixture was then placed in a refiner to reduce its particle size for 24 hours. Thereafter, the content was transferred into a conche, 300 grams of lecithin was added, and the composition was kneaded at 50° C. for 48 hours. Then, the content was placed in a shaping apparatus, and solidified.

The products are low-cariogenic and low-calorie chocolate with excellent texture. Also, the organoleptic test carried out with 20 panelists revealed no lingering after-taste. The most desirable ones were the products with Rebaudioside-98.9% (19 members) and Stevioside 99.3% (16 members).

Example 8

Ice-Cream 1.50 kg of whole milk were heated to 45° C., and 300 grams of milk cream, 100 grams of tagatose, 90 grams of sorbitol, 6 grams of carrageenan as a stabilizer, 3 grams of polysorbate-80 as an emulsifier, and 1.0 gram of sweetener prepared according to the EXAMPLES 2 or 3, were added into the milk and was stirred until the ingredients completely dissolved. The mixture then was pasteurized at a temperature of 80° C. for 25 seconds. The homogenization of the obtained mixture was carried out at a pressure of 800 bars and the samples were kept at a temperature of 4° C. for 24 hours to complete the aging process. Vanilla flavor (1.0% of the mixture weight) and coloring (0.025% of the mixture weight) are added into the mixture after aging. The mixture was then transferred to ice cream maker to produce ice cream automatically. Samples of ice creams produced were transferred to seal containers and were kept in the freezer at a temperature of −18° C.

The application of sweeteners does not affect the physicochemical properties of ice cream, as well as the overall attributes of color, smoothness, surface texture, air cell, vanilla aroma intensity, vanilla taste, chalkiness, iciness and melting rate. Organoleptic test carried out with 20 panelists. The most desirable ones were the products with 98.9% Rebaudioside A (18 members) and 99.3% Stevioside (14 members).

Example 9

Yogurt

In 5 kg of defatted milk, 4.0 grams of sweetener, prepared according to EXAMPLES 2 and 3, were dissolved. After pasteurizing at 82° C. for 20 minutes, the milk was cooled to 40° C. A starter in amount of 150 grams was added and the mixture was incubated at 37° C. for 6 hours. Then, the fermented mass was maintained at 10-15° C. for 12 hours.

The product is a low-calorie and low-cariogenic yoghurt without foreign taste and odor.

Example 10

Table Top Tablet

A mixture, consisting of 58.5% lactose, 10% calcium silicate, 5% cross-carmellose, 5% L-leucine, 1% aerosol 200, 0.5% magnesium stearate, and 20% of a sweetener, obtained according to the EXAMPLE 2 or 3, was kneaded sufficiently. Then the mixture was shaped with the use of a tabletting machine, equipped with punchers of 6.2 mm diameter, into tablets of 70 mg each, 3.0 mm thick, and 10±1 kg hardness The tablets can be easily administrated due to their appropriate sweetness. However, the formulations using low grade of Stevioside and Rebaudioside A were somewhat sticky with solubility about 3-4 minutes in water at 25° C. The tablets, prepared with highly purified Rebaudioside A show the best characteristics with the solubility around 20-30 seconds.

Example 11

Tooth Paste

A tooth paste was prepared by kneading a composition comprising of calcium phosphate, 45.0%; carboxymethylcellulose, 1.5%; carrageenan, 0.5%; glycerol, 18.0%; polyoxyethylene sorbitan mono-ester, 2.0%; beta-cyclodextrin, 1.5%; sodium laurylsarcosinate, 0.2%; flavoring, 1.0%; preservative, 0.1%; Rebaudioside A or Stevioside, obtained according to the EXAMPLE 2 or 3, 0.2%; and water to 100%, by usual way. The product possesses good foaming and cleaning abilities with appropriate sweetness.

Example 12

Soy Sauce 0.8 g of Rebaudioside A/Stevioside mixture (1:1, w/w) obtained according to the invention was added to 1000 mL of soy sauce and mixed homogenously. The products had an excellent taste and texture.

Example 13

Bread 1 kg of wheat flour, 37.38 grams of fructooligosaccharide syrup, 80 grams of margarine, 20 grams of salt, 20 grams of yeasts, and 0.25 grams of high purity Rebaudioside A or Stevioside, obtained according to the EXAMPLE 2 or 3 were placed into the blender and mixed well. 600 ml of water was poured into the mixture and kneaded sufficiently. At the completion of the kneading process, the dough was shaped and raised for 30 to 45 minutes. The ready dough was placed in oven and baked for 45 minutes. Bread samples had creamy white color, and smooth texture.

Example 14

Diet Cookies

Flour (50.0%), margarine (30.0%), fructose (10.0%), maltitol (8.0%), whole milk (1.0%), salt (0.2%), baking powder (0.15%), vanillin (0.1%), Rebaudioside A or Stevioside (0.55%), obtained according to this invention were kneaded well in dough-mixing machine. After molding of the dough the cookies were baked at 200° C. for 15 minutes.

The product is a low-calorie diet cookie with excellent taste and appropriate sweetness.

Example 15

Cake 123 g of hen eggs, 45 g of sugar, 345 g of sorbitol liquid, 2.0 g of sucrose fatty acid ester, 0.35 g of Rebaudioside A or Stevioside was mixed with 100 g of wheat flour and 200 g of water in order to prepare a cake according to a conventional method. The product had an excellent taste with an optimal sweet flavor.

The following examples describe a process to make a sucrose-based sweetener with *Stevia*-based sweeteners having improved taste, mouthfeel and flavor properties. Because sucrose and *Stevia*-based sweeteners have very different melting characteristics and solubility, conventional co-crystallization techniques would not result in a suitable product. For example, while sugar is about 66% soluble in water, Rebaudioside A is only about 1% soluble, and *Stevia* 95 (containing steviol glycosides at 95% purity) is only about 34% soluble in water. Sugar has a melting point of about 186° C., while Rebaudioside A has a melting point of about 240° C., and *Stevia* 95 is mostly amorphous.

Because of these and other disparities, conventional processes would not lead to a suitable product.

Instead, the following process was developed to overcome the difficulties associated with working with sweetening components having such different properties. The resulting low-calorie sweetener can be used in any food, beverage or consumer healthcare product. Other ingredients can be incorporated into the low-calorie sweetener using this process, including but not limited to sugar, salt, vitamins, minerals, supplements, homeopathic agents, preservatives, citric acid, juniper tincture, ascorbic acid, sodium benzoate, colorings, flavorings, and a combination thereof.

Although the processes described in the following Examples make references to the sweeteners made in Examples 1-3, it is to be understood that these processes can be used with any *Stevia*-based sweeteners, including but not limited to Rebaudioside A, Stevioside, and purified sweet steviol glycoside mixtures, made by using any process, including the enzymatic transglycosylation processes described in co-pending U.S. patent application Ser. Nos. 11/246,066, 12/684,129 and 12/684,130, the entire contents of which are incorporated by reference herein. The processes described in these co-pending applications involve an enzymatic transglycosylation process using CGTases (cyclodextrin glycosyltransferase) produced by cultures of *Bacillus stearothermophilus* to produce *Stevia*-based sweeteners, including, but not limited to, Steviosides, Rebaudioside A and purified sweet steviol glycoside mixtures.

Example 16

Sugar (Sucrose) Based Sweetener with Stevioside 1488 g of granulated sugar with moisture content adjusted to 0.80% was distributed to form a layer with thickness of 30 mm on a vibrating tray. 12.05 g stevioside obtained according to EXAMPLE 2, was dissolved in 18.07 g of solvent mixture containing 4 volumes of water per 1 volume of ethyl alcohol to make stevioside 40% (w/w) solution. The solution was heated up to 40° C. for prevention of crystal formation and was dispersed on the granulated sugar by means of an air-powered pneumatic method with pressure of compressed air at 0.1 MPa over a period of 100 seconds while maintaining the intensity of vibration at 1200 vibrations per minute (vpm). The granulated sugar was dried over a period of 10 minutes by means of a convective method in a drum-type drying apparatus set at a temperature of 65° C. until its moisture content was 0.09%.

The sweetener produced has a homogenous and intact structure of crystal sugar and has a taste profile identical to sucrose, with sweetness power about or at least about 3 times higher than sugar.

Example 17

Sugar (Sucrose) Based Sweetener with Rebaudioside A 1490 g of granulated sugar with moisture content adjusted to 0.90% was distributed to form a layer with thickness of 30 mm on a vibrating tray. 10.03 g rebaudioside A obtained according to EXAMPLE 3, was dissolved in 15.04 g of solvent mixture containing 4 volumes of water per 1 volume of ethyl alcohol to make rebaudioside A 40% (w/w) solution. The solution was heated up to 40° C. for prevention of crystal formation and was dispersed on the granulated sugar by means of an air-powered pneumatic method with pressure of compressed air at 0.1 MPa over a period of 100 seconds while maintaining the intensity of vibration at 1200 vpm. The granulated sugar was dried over a period of 10 minutes by means of a convective method in a drum-type drying apparatus set at a temperature of 65° C. until its moisture content was 0.08%.

The sweetener produced has a homogenous and intact structure of crystalline sugar and has a taste profile identical to sucrose, with sweetness power about or at least about 3 times higher than sugar.

Example 18

Sugar (Sucrose) Based Sweetener with Reb A and Steviol glycoside Mixtures

A mixture of 50 kg of sugar with 192 gm of Reb A obtained according to EXAMPLE 3 was thoroughly blended in a ribbon blender and then compacted into sheets of product using a roll compaction unit (IR 520 roll compactor or similar unit) applying roll speeds ranging between about 12 to 16 rpm under a roll pressure of about 14 to 17 bar, which was then milled and classified to get optimum sized granules of the sugar-Reb A blend.

The sugar-Reb A granules had sweetness profile like sugar with about two times the sweetness potency of sugar A mixture of 65 kg of sugar with 188 μm of Steviol Glycoside obtained according to EXAMPLE 1 was thoroughly blended in a ribbon blender and then compacted into sheets of product using a roll compaction unit (IR 520 roll compactor or similar unit) applying roll speeds ranging between about 12 to 16 rpm under a roll pressure of about 14 to 17 bar, which was then milled and classified to get optimum sized granules of the sugar-Steviol Glycoside blend.

The sugar-Steviol Glycoside granules had a sweetness profile like sugar with at least 50% higher sweetness than sugar alone.

Example 19

Sugar Based Sweetener with Reb A.

A sugar solution of 65 kg of refined sugar in 35 kg of warm water was made and mixed thoroughly with 138 μm of Reb A obtained according to EXAMPLE 3. The solution mixture was passed through multiple-effect evaporators, and then to the vacuum pans to reach the desired level of super-saturation, when the sugar liquor is "seeded" with invert sugar to initiate formation of sugar crystals. The sugar liquor with developing crystals is then discharged in a mixer to complete the crystallization and then to a centrifugal for separation of crystals from mother liquor. The separated crystals are then dried in a fluidized bed dryer/cooler.

The co-crystallized sugar-Reb A had sweetness profile like sugar with at least 50% higher sweetness potency than sugar alone.

Example 20

Sugar (Sucrose) Based Sweetener with a Purified Sweet Steviol Glycoside Mixture 1488 g of granulated sugar with moisture content adjusted to 0.80% was distributed to form a layer with thickness of 30 mm on a vibrating tray. 11.58 g of the purified sweet steviol glycoside mixture obtained according to EXAMPLE 1 was dissolved in 17.37 g of solvent mixture containing 4 volumes of water per 1 volume of ethyl alcohol to make 40% (w/w) solution. The solution was heated up to 40° C. for prevention of crystal formation and was dispersed on the granulated sugar by means of an air-powered pneumatic method with pressure of compressed air at 0.1 MPa over a period of 100 seconds while maintaining the intensity of vibration at 1200 vpm. The granulated sugar was dried over a period of 10 minutes by means of a convective method in a drum-type drying apparatus set at a temperature of 65° C. until its moisture content was 0.05%.

The sweetener produced has a homogenous and intact structure of crystalline sugar and has taste profile identical to sucrose with sweetness power 3 times higher than sugar.

In the following examples, a low intensity sweetener, such as sucrose, is combined with a crystallization inhibitor in water. The ratio of the low intensity sweetener to the crystallization inhibitor is between about 1:1 to about 100:1 (w/w), or preferably between about 50:1 to about 80:1 (w/w).

In Examples 21 and 22, the resulting solution is then purged with nitrogen at a rate of about 1 to about 10 liters per minute per liter of solution, at a temperature of about 50° C. to about 80° C., preferably between about 65° C. to about 75° C. The purging takes place for a period of about 0.5 hours to about 10 hours, preferably about 1 hour to about 2 hours.

The solution is then combined with a solution of a high intensity sweetener, and the combined solution is evaporated to obtain a concentrated sweetener composition with about 90% to about 97% (w/w) total solids. The evaporation can be carried out using any suitable device, at a temperature of about 100° C. to about 150° C., preferably about 120° C. to about 140° C., under a vacuum of about 300 mbar to about 800 mbar, preferably about 600 mbar to about 800 mbar, for a period of about 0.5 minute to about 2 minutes, preferably for about 0.7 minute to about 1.3 minutes.

The concentrated sweetener composition is then fed to an impact beating apparatus, such as, but not limited to, a shear mixer, turbulizer, aerator, extrusion device or any other device capable of introducing shear mechanical impact or agitation to the concentrated sweetener composition. The mechanical impact duration on the concentrated sweetener composition is about 0.01 second to about 300 seconds, preferably about 0.5 second to 100 seconds, and more preferably about 10 seconds to about 60 seconds.

In one embodiment, the impact beating apparatus is provided with a water vapor removal system to remove water vapor formed by the fast release of the heat of crystallization of the concentrated sweetener composition as sugar granules are foirmed. The water vapor removal system can be, but is not limited to, a vacuum condenser, a dry gas supply, and the like. If dry gas is used, examples of suitable gas are air and nitrogen.

The resulting sweetening composition granules are then dried using any apparatus suitable for drying granules or powder, such as, but not limited to, a vacuum dryer, belt dryer, fluid bed dryer, and the like. The drying can take place at a temperature of about 50° C. to about 80° C., preferably about 60° C. to about 70° C.

The granules are then sifted to obtain fractions of various particle sizes. In one embodiment, the particle sizes ranged from about 0.5 mm to about 2 mm.

Example 21

Sugar (sucrose) Based Sweetener with a Purified Sweet Steviol Glycoside Mixture 50 kg of granulated sugar and 1 kg of invert sugar were dissolved in 30 liters of water at 80° C. The obtained solution was maintained at 70° C. and purged with nitrogen through a nozzle installed at the bottom of the tank during 1 hour. The nitrogen was delivered at a rate of about 1 liter per minute per liter of solution. 175 g of purified sweet steviol glycoside mixture obtained according to EXAMPLE 1 was dissolved in 0.3 liter of water and added to the sugar solution. The solution was evaporated in vacuum evaporator at 800 mbar vacuum and 125° C. until 95° brix was achieved. The feed rate to evaporator was adjusted to achieve solution residency time of 0.5 to 1 min. The evaporated solution was fed to an impact beating machine (Bepex Turbulizer type) operating at 50 rpm. The shear mixing action of the impact beater initiated intense crystallization and residual water evaporation due to the fast release of heat of crystallization. This transformed the sugar solution into free flowing granules approx 1-2 mm in diameter. The impact beating device was connected to a vacuum condenser to facilitate quick removal of water vapors from crystallization zone and preventing "caking" of obtained granules. The residual moisture of obtained granulated powder was 2.5%. The granules were transferred to a drum-type drying apparatus set at a temperature of 65° C. and dried until its moisture content was 0.06%.

The produced sweetener appeared as white granular powder and had taste profile identical to sucrose with a sweetness power 2 times higher than sugar.

Example 22

Sugar (Sucrose) Based Sweetener with Rebaudioside A 50 kg of granulated sugar and 1 kg of invert sugar were dissolved in 30 liters of water at 80° C. The obtained solution was maintained at 70° C. and purged with nitrogen through a nozzle installed at the bottom of the tank during 1 hour. The nitrogen was delivered at a rate 1 liter per minute per liter of solution. 150 g of Rebaudioside A obtained according to EXAMPLE 3 was dissolved in 0.3 liter of water and added to the sugar solution. The solution was evaporated in vacuum evaporator at 800 mbar vacuum and 125° C. until 95° brix was achieved. The feed rate to evaporator was adjusted to achieve solution residency time of 0.5 to 1 min. The evaporated solution was fed to an impact beating machine (Bepex Turbulizer type) operating at 50 rpm. The shear mixing action of the impact beater initiated intense crystallization and residual water evaporation due to the fast release of heat of crystallization. This transformed the sugar solution into free flowing granules approx 1-2 mm in diameter. The impact beating device was connected to a vacuum condenser to facilitate quick removal of water vapors from crystallization zone and preventing "caking" of obtained granules. The residual moisture of the obtained granulated powder was 3%. The granules were transferred to a drum-type drying apparatus set at a temperature of 65° C. and dried until its moisture content was 0.08%.

The produced sweetener appeared as white granular powder and had taste profile identical to sucrose with sweetness power 2 times higher than sugar.

Example 23

Sugar (Sucrose) Based Sweetener with Rebaudioside A 50 kg of granulated sugar and 1 kg of invert sugar were dissolved in 30 liters of water at 80° C. 150 g of Rebaudioside A obtained according to EXAMPLE 3 was dissolved in 0.3 liter of water and added to the sugar solution. The solution was evaporated in a vacuum evaporator at 800 mbar vacuum and 125° C. until 95° brix was achieved. The feed rate to the evaporator was adjusted to achieve solution residency time of 0.5 to 1 min. The evaporated solution was fed to an impact beating machine (Bepex Turbulizer type) operating at 50 rpm. The shear mixing action of the impact beater initiated intense crystallization and residual water evaporation due to fast release of heat of crystallization. This transformed the sugar solution into free flowing granules approx 1-2 mm in diameter. The impact beating device was connected to a vacuum condenser to facilitate quick removal of water vapors from crystallization zone and preventing "caking" of obtained granules. The residual moisture of obtained granulated powder was 3%. The granules were transferred to drum-type drying apparatus set at a temperature of 65° C. and dried until its moisture content was 0.08%.

The produced sweetener appeared as yellowish granular powder and had taste profile close to sucrose with sweetness power 2 times higher than sugar.

Example 24

Control Solutions of Sweetener Compositions

Sucrose, invert sugar, Rebaudioside A obtained according to EXAMPLE 3, and purified sweet steviol glycoside mixture obtained according to EXAMPLE 1 were dissolved in the water to prepare the control samples for sweetener compositions. The concentration of components is indicated in Table 4.

TABLE 4

Control samples

| Control samples | Concentration, mg/L | | | |
|---|---|---|---|---|
| | Sucrose | Invert sugar | Steviol glycosides | RebA |
| Control sucrose | 50,000 | 0 | 0 | 0 |
| Control Steviol glycosides | 24,420 | 488.5 | 91.5 | 0 |
| Control RebA | 24,440 | 488.8 | 0 | 73.3 |

Example 25

Taste Evaluation of Sugar Based Sweeteners

A trained panel of 15 sensory analysts evaluated the control samples and the sweeteners compositions prepared according to Examples 21, 22, 23. The sweetener compositions were dissolved in water at 2.5% (wt/vol) concentrations. The evaluation results are summarized in Table 5.

TABLE 5

Evaluation of sweetener compositions

| Samples | Evaluation results | | | |
|---|---|---|---|---|
| | Sweetness | Bitterness | Sweetness lingering | Licorice aftertaste |
| Control sucrose | ++++ | − | − | − |
| Control Steviol glycosides | ++++ | ++++ | ++++ | ++++ |
| Control RebA | ++++ | +++ | +++ | +++ |
| Steviol glycoside composition (EXAMPLE 21) | ++++ | + | + | − |
| Reb A composition (EXAMPLE 22) | ++++ | − | + | − |
| Reb A composition (EXAMPLE 23) | ++++ | +++ | ++ | ++ |

The samples prepared according to Examples 21, 22, 23 demonstrated significant improvements in key taste attributes in comparison with respective control samples. The samples prepared by process of Examples 21 and 22 were significantly superior to sample prepared by process of Example 23. Therefore it can be concluded that the deoxygenation of solution by nitrogen purge reduces the color formation and undesirable taste characteristics of final compositions.

It is to be understood that the foregoing descriptions and specific embodiments shown herein are merely illustrative of the best mode of the invention and the principles thereof, and that modifications and additions may be easily made by those skilled in the art without departing for the spirit and scope of the invention, which is therefore understood to be limited only by the scope of the appended claims.

What is claimed is:

1. A low-calorie sweetener composition comprising Rebaudioside A as a high intensity sweetener, invert sugar as a crystallization inhibitor, and sucrose as a low intensity sweetener, said composition made by a process comprising the steps of:
   a) providing a nitrogen-purged solution of sucrose and invert sugar made by process of dissolving sucrose and invert sugar, at a ratio of between about 1:1 to about 100:1, in water to make a solution with 60% to 80% (w/w) total solids content, and purging the solution with nitrogen at a rate of about 1 to about 10 liters per minute per liter of solution, at a temperature of about 50° C. to about 80° C., for about 0.5 hours to about 10 hours;
   dissolving the Rebaudioside A in water to obtain a Rebaudioside A solution with about 10% to about 70% (w/w) solids;
   c) adding the Rebaudioside A solution to the nitrogen-purged solution to obtain a sweetener composition solution containing about 50% to about 80% (w/w) total solids;
   d) evaporating the sweetener composition solution to obtain a concentrated sweetener composition solution with about 90% to about 97% (w/w) solids content;
   e) feeding the concentrated sweetener composition solution to an impact beating apparatus to induce intensive crystallization and residual water evaporation, and to produce free flowing granules of the sweetener composition;
   f) drying the granules to form the low-calorie sweetener composition,
   wherein the low-calorie sweetener composition comprises sucrose, invert sugar, and Rebaudioside A to provide a sweetness, lack of bitterness, and lack of licorice aftertaste identical to sucrose.

2. The low-calorie sweetener of claim 1, wherein the Rebaudioside A has a purity of at least about 98%.

* * * * *